United States Patent [19]

Andersson et al.

[11] 4,421,181

[45] Dec. 20, 1983

[54] VIBRATION-DAMPING ARRANGEMENT

[75] Inventors: Roland Andersson, Upplands Väsby; Per-Erik Höglund; Bo Glimskär, both of Stockholm, all of Sweden

[73] Assignee: Byggergonomilaboratoriet HB, Sweden

[21] Appl. No.: 340,758

[22] Filed: Jan. 19, 1982

[30] Foreign Application Priority Data

Jan. 28, 1981 [SE] Sweden ............................ 8100532

[51] Int. Cl.³ .............................................. E21B 12/00
[52] U.S. Cl. .................................. 173/162 H; 74/551.9
[58] Field of Search ...................... 173/162 H, 162 R; 74/551.9

[56] References Cited

U.S. PATENT DOCUMENTS

| 2,101,869 | 12/1937 | Noble | 173/162 H X |
| 2,984,210 | 5/1961 | Fuehrer | 173/162 H |
| 3,889,763 | 6/1975 | Dillon | 173/162 H |
| 4,044,625 | 8/1977 | D'Haem et al. | 173/162 H X |

Primary Examiner—Frank T. Yost
Attorney, Agent, or Firm—Kinzer, Plyer, Dorn & McEachran

[57] ABSTRACT

A vibration-damping arrangement comprises a chamber (22) containing gas at a pressure above atmospheric pressure. Vibrations from a machine (33) are supplied to a wall section (23) made of flexible rubber or the like and a rigid section (36) is in contact with the person to be protected. To achieve a pressure rise in the chamber corresponding to the amplitude of the vibrations, the flexible section is non-stretchable. The amplitude-dependent pressure rise implies absorption of energy also within a low-frequency range.

6 Claims, 10 Drawing Figures

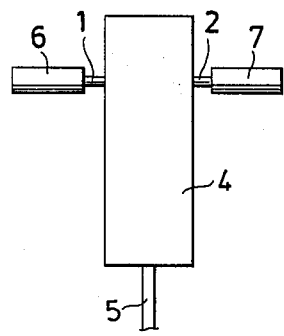
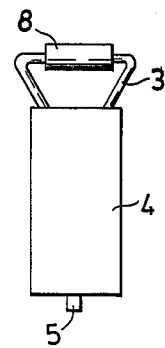
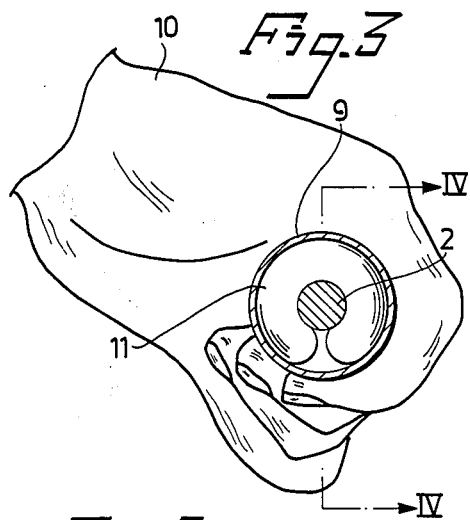
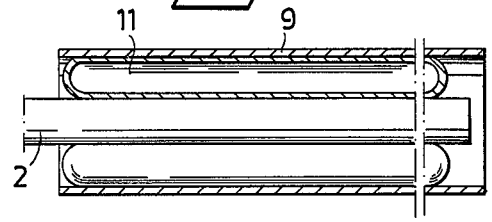
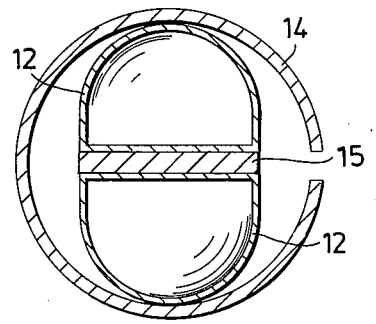
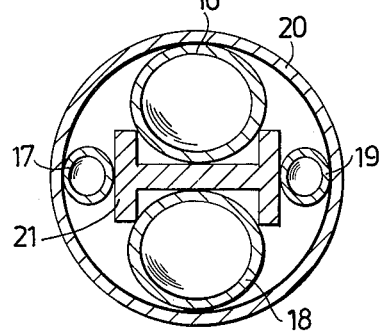

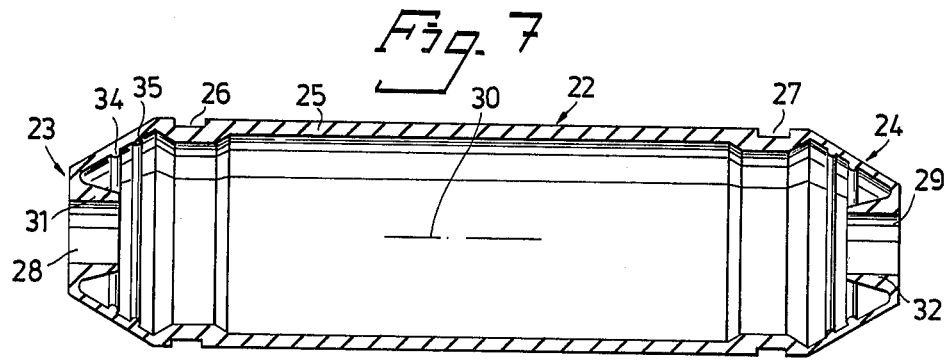
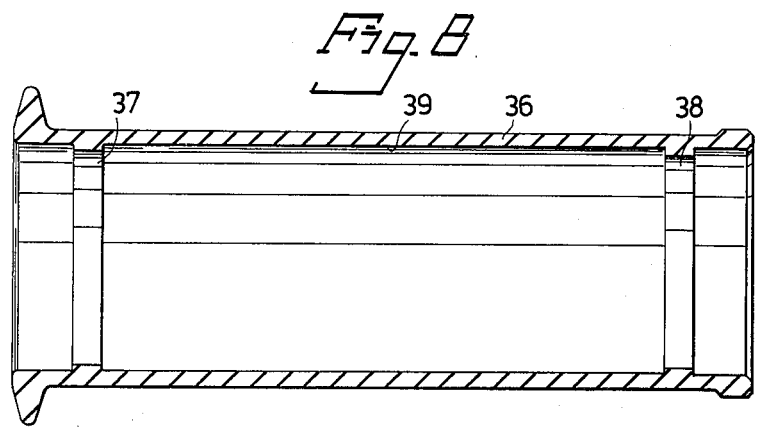
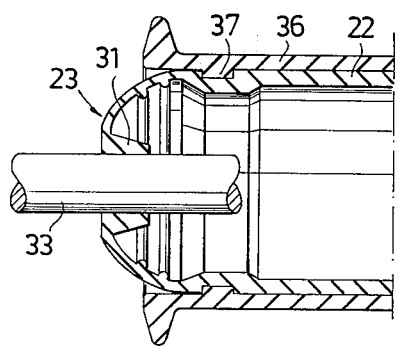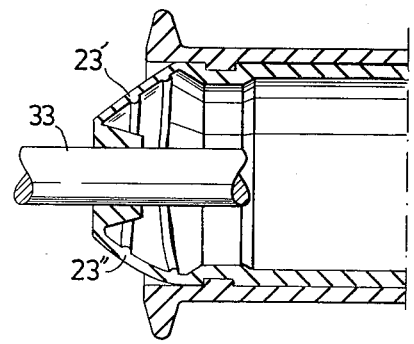

VIBRATION-DAMPING ARRANGEMENT

The present invention relates to a vibration-damping arrangement for damping of vibrations from a machine or tool, comprising a dense, hollow and flexible chamber containing a gas at a pressure higher than ambient pressure and arranged to receive the said vibrations and a rigid casing partially surrounding the gas-filled chamber arranged to be in contact with the body of a person.

A major problem encountered in connection with tools and machines which generate vibrations which, via a handle, a vehicle steering wheel or the like, are subsequently transmitted to an individual, is a condition known as white hands, caused by deterioration of the blood circulation in consequence of the vibrations and, in some cases, also damage to capillary vessels in the hands or other part of the body directly subject to the vibrations. The vibration-damping means normally used consists of gas-filled cushions, which are attached between the machine and, for example, the gripping handle of a machine. Such damping arrangements are known for instance through DE-OS No. 3 007 126, which describes a hollow body of an elastic material, which may be filled with a gas under pressure, for example compressed air, and which is intended to be applied around, for instance, a handle for a vibrating tool. A vibration damper of this kind does not solve the fundamental problem on which the invention is based, since an appreciable damping effect is only accomplished at frequencies in excess of 6000–7000 Hz.

With the present function of vibration dampers and in consequence of new research findings, it has become necessary to issue recommendations concerning the maximum working time with the machine. These limitations on maximum working time in order to prevent injury to the worker are often as low as 20–30 minutes. Obviously, such limitations lead to poor utilization of the machines or require a large input of personnel.

For these reasons, a primary object of the invention is to provide a vibration-damping arrangement of the kind described in the preamble which efficiently eliminates transmission to the worker not only of the high-frequency vibrations but also of low-frequency vibrations within the range of 0–6000 Hz.

This object is fully realized by means of the present invention as defined in the accompanying claims, and which is based on the discovery that the gas-filled body is capable of completely or largely eliminating the vibration forces if the pressure in the body increases in the event of an onsetting vibrational surge.

Exemplary embodiments of the arrangement according to the invention will now be described with reference to the accompanying drawings, wherein FIG. 1 illustrates a machine having a handle on both sides of a housing.

FIG. 2 illustrates the same machine having a stirrup-shaped handle,

FIG. 3 shows the right-hand handle in FIG. 1 in an end view,

FIG. 4 is a sectional view along the line of IV—IV in FIG. 3,

FIG. 5 is a radial section through a modified embodiment of the invention,

FIG. 6 illustrates another embodiment of the invention,

FIG. 7 is a section through a further embodiment of a gas-filled body,

FIG. 8 shows a sleeve arranged to surround the body according to FIG. 7,

FIG. 9 shows one end of an installed damping arrangement comprising the parts shown in FIGS. 7 and 8, and FIG. 10 shows the function of the arrangement according to FIGS. 7–9 in the event of an occurring surge force.

In FIGS. 1 and 2 there is shown a vibrating machine, for example a rock-drilling machine or a concrete vibrator, provided with handles 1, 2 and 3, respectively. Respective machines are provided with a housing 4 accommodating a hydraulic, pneumatic or electric motor, or a tool 5 which generates vibrations as a result of impact, or as a result of some other forces acting thereon. Unless effective measures are taken, vibrations generated in the housing 4 will be transmitted to the hands of the machine operator through the handles 1, 2 and 3. As mentioned previously, in order to reduce the vibrations, the handles are provided with vibration-damping means, referenced 6, 7 and 8 respectively in FIGS. 1 and 2.

FIGS. 3 and 4 illustrate a vibration-damping arrangement according to the invention. The damping arrangement is shown mounted in the handle 2 to the right of FIG. 1, which handle is made of a rigid material, such as steel for example. The arrangement comprises an external cylindrical grip 9 arranged to be grasped by the hand 10 of the operator. Arranged around the handle 2 is an elongate, airtight bladder 11 which is filled with gas, e.g. air, at a pressure above ambient or atmospheric pressure, suitable at a pressure exceeding 1 atm above the atmospheric or more. The magnitude of the gas pressure is dependent on the amplitude of the vibrations acting on the handle 2, and increases with increasing amplitude of oscillation. The bladder, or pressure chamber 9, is made from a material which is flexible but not stretchable, or which can only be stretched to a negligible extent, for example an airtight plastics material, a woven reinforced rubber material, or the like.

The bladder 11 may be glued in a punctiform manner to the inside of the grip 9 or handle 2, or secured thereto in any other suitable manner. It is normally assumed, however, that the size of the bladder is such as to cause it to wedge firmly in between the sleeve 9 and the handle 2. It is essential that there is no direct mechanical contact between grip and handle which might be liable to transmit vibrations. When the handle 2 is subjected to radially acting vibrations or oscillations, the gas in the bladder 11 will be compressed and the gas pressure will rise proportionally to the magnitude of the vibrations. It is essential that the material from which the bladder 11 is made cannot be stretched, or can only be stretched to an insignificant degree, to enable the desired variations in compression to be obtained in response to vibrations from the handle. Test have shown that an extraordinarily good vibration-inhibiting effect is obtained by means of the invention throughout the whole of the frequency range relevant to both slow and fast-operating machines.

In order to protect the bladder 11, the end of the grip 9, shown to the right of FIG. 4, may be provided with a protective cap or a thin membrane. Although not shown in the drawing, the pressure chamber of bladder 11 may suitably be provided with a valve through which air under pressure may be supplied to the bladder interior.

FIG. 5 illustrates a modified embodiment, in which two bladders, 12 and 13, are arranged between an external, slit grip 14 and an internal handle 15 which is connected to the machine and which has a rectangular cross-sectional shape. The bladders, which have the form of elongate hoses, are fixedly glued to the handle 15. The bladders 12 and 13 are also anchored between the inner wall of the grip 14 and the outer surfaces of the handle 15, as a result of the pressure prevailing in the bladders.

FIG. 6 is a radial sectional view of another embodiment, this embodiment having four bladders 16, 17, 18 and 19 tensioned between a grip 20 and a handle 21 connected to the tool.

Although the illustrated grips 11, 14 and 20 have a cylindrical shape, it will be understood that the outer and inner surfaces thereof may have any suitable shape whatsoever. The pressure chambers or bladders 11, 12, 13, 16, 17, 18 and 19 preferably extend along the whole of the grip. Each bladder, for example the bladder 11, may be divided axially of the handle into a plurality of mutually adjacent bladders, or may comprise a plurality of spherical bladders packed between the grip and the handle.

The sole function in practice of the described, preferably rigid grip, for example the grip 9, is to protect the bladder or bladders and to form a means which can be given an anatomically correct shape. Thus, the grip may be omitted and the bladder or bladders gripped directly. It is also possible to provide bladders whose portions facing the hand have a rigid wall, which can be formed in any suitable manner, whereas the part of the bladder or bladders facing the handle form the requisite, flexible part of the bladder.

If desired, the requisite bladder working under a pressure above atmospheric or ambient pressure may have the form of a hose wound helically about the handle.

FIGS. 7–10 illustrate a further embodiment of the invention. This embodiment comprises a hollow body 22 of flexible and stretchable material, for instance a rubber material with tapered end sections 23 and 24 respectively, as well as a cylindrical section 25, affording the connection between said end sections 23 and 24. The ends of the cylindrical sections 25 are furnished with annular grooves 26 and 27 respectively, and the tapered end sections 23, 25 are provided with apertures 28 and 29 respectively, being centred in relation to the central axis 30 of the cylindrical section 25. Annular flanges 31 and 32 respectively for accommodation of a handle 33 (FIG. 9) are connected to the apertures 28 and 29. The flanges 31 and 32 are connected in an airtight manner with the handle 33, for instance by vulcanizing, gluing or some other suitable means. The material in the tapers 23 and 24 is made as thin as possible, and each taper may be provided on the outside or as shown on the inside with annular stiffening ribs, for example the stiffening ribs 34 and 35.

A grip 36 of rigid material, for example metal or plastic, cooperates with the body 22. On the inside, the grip 36 is provided with 2 annular flanges 37 and 38 which, when the flexible hollow body 22 is inserted into the sleeve, snap into the grooves 26 and 27 respectively, causing the body 22 to be retained in an axially determined position relative to the sleeve 36. This position is evident from, for example, FIG. 9, which shows the left end of body 22, the sleeve 36 and the portion of the handle 32 which is connected in an airtight manner with the body 22.

FIG. 7 shows the elastic hollow body 22 in the unloaded state, i.e. when the inner pressure is equal to the outer pressure, while FIG. 9 shows the loaded state, i.e. when the airtight body 22 has an inner positive pressure exceeding ambient pressure by approx. 1 atmosphere or more. In this condition the central section 25 of the body 22 is firmly tensioned towards the inner surface 39 of the sleeve 36. The free portions of the body 22, i.e. the shown tapered end sections 23 and 24, have been stretched out, as is evident from FIG. 9. The inner pressure in the body 22 and the properties and dimensions of the material in the free end sections 23 and 24 have been so chosen that a further stretching of the end sections 23 and 24 requires a relatively large force, relative to that required to accomplish this initial stretching by means of the inner positive pressure. Preferably, the inner positive pressure has accomplished a stretching which approaches the maximum stretch, with an adequate margin of safety to the rupture limit of the material. The implication is that the material in the end sections 23 and 24 may be regarded as virtually unstretchable for transiently acting surge forces, i.e., it will be possible despite a non-reinforced elastic material having been chosen for the body 22 to bring about the requisite compression of the air or gas enclosed in the body 22.

This compression process is illustrated by FIG. 10, which shows the state of the arrangement illustrated in FIG. 9, when the handle 33 connected to the machine performs a downward stroke during the vibrations. The upper portion 23' of end section 23 will then be straightened out and consequently the total volume in the interior of the body 22 will be reduced in correspondence to the difference between the expanded state for the respective end section in FIG. 9 to the levelled-out state shown in FIG. 10. No corresponding stretching of the free end portion 23" lying under the handle 33 takes palce, since the flexible material is under great tension and the relief accomplished through the downward movement of the handle 33 is not so great as to permit any further stretching. No volumetric increase occasioned by the downward movement is obtained, but on the contrary a volumetric decrease occasioned by the straightening out of portion 23' and thus a momentaneous rise in pressure occasioned byt the movement of the handle 33 will be obtained, leading to an absorption of kinetic energy.

It has been assumed above that the free end portions 23, 24 are conically shaped in the unloaded state, but naturally they may also be, for example, spherical and, furthermore, the sleeve 36 may have an essentially triangular or rectangular cross-sectional area. The apertures 28 and 29 must also be adapted to the cros-sectional area of the handle 33.

The choice of material and the mode of loading the material according to the invention enable the walls of the gas-filled bodies to be made considerably thinner than is customary in conventonal elastic bladders or bodies, and this in turn enables the vibration forces transmitted via the material to be kept at a minimum level.

Over and above the embodiments described above, different modifications are possible without departing from the inventive concept. It is thus possible to replace the inactive section, for example the section 25 with the rigid casing 36, whereupon the flexible end sections 23 and 24 are glued or gastight connected in some other suitable manner with the inner edge section at the inside or outside of the ends of the casing. The flexible wall section of the gas-filled body thus forms one of the end sections 23 and 24.

We claim:

1. A vibration-damping arrangement for damping of vibrations from a machine (4) or the like, comprising at least one tight, hollow and flexible chamber (11; 12; 13; 16–19; 22) containing a gas with a pressure exceeding ambient pressure and arranged to be supplied with the said vibrations and a rigid casing (9; 14; 20; 36) partially surrounding the gas-filled chamber, arranged to be in contact with the body of a person, characterized in that the wall of the gas-filled chamber (11; 12; 13; 16–19; 22) is essentially non-stretchable.

2. A vibration-damping arrangement according to claim 1, characterized in that the gas-filled chamber comprises a bladder means (11; 12; 13; 16–19) of a polymer material, for example rubber of plastic material.

3. A vibration-damping arrangement according to claim 2, characterized in that the material is reinforced by means of a woven fabric or the like.

4. A vibration-damping arrangement according to claim 2 or 3, characterized in that the bladder means has the form of an elongate hose.

5. A vibration-damping arrangement according to any one of claims 1–3 characterized in that the gas-filled chamber is wound or folded around a handle (1, 2, 3; 15; 21) connected to the machine (4).

6. A vibration-damping arrangement according to any one of claims 1–3, characterized in that the hollow gas-filled chamber (22) is elongate and provided with two end sections (23, 24) of elastic material, which material under the influence of the interior pressure of the body has been so stretched that further appreciable stretching requires a force exceeding calculated normally occurring vibrational forces and in that the section (25) located between the end sections is united with the said rigid means (36).

* * * * *